United States Patent [19]

Check et al.

[11] 3,826,484
[45] July 30, 1974

[54] WORKPIECE POSITIONING AND HOLDING APPARATUS

[75] Inventors: John M. Check, Chelsea; Gary F. Rupert, Ann Arbor, both of Mich.

[73] Assignee: Raycon Corporation, Ann Arbor, Mich.

[22] Filed: Dec. 7, 1972

[21] Appl. No.: 312,815

[52] U.S. Cl. ............... 269/299, 29/203 P, 269/274, 269/321 N, 269/321 WE
[51] Int. Cl. ........................................... B23g 3/18
[58] Field of Search ........... 269/37, 40, 43, 95, 287, 269/321 WE, 321 N, 299, 157, 266, 268, 279; 29/200 P, 200 J, 203 P, 203 J

[56] References Cited
FOREIGN PATENTS OR APPLICATIONS
471,838  3/1951  Canada ............................... 269/43

Primary Examiner—Roy Lake
Assistant Examiner—E. F. Desmond
Attorney, Agent, or Firm—Olsen and Stephenson

[57] ABSTRACT

Cassette-type apparatus in which a plurality of workpieces can be mounted in fixed positions on a body member prior to mounting of the body member in a fixed position in which work is to be done on the workpieces. The body member functions as the cassette and is provided with a plurality of locating surfaces. An adjustable support unit has surfaces located to support the body member locating surfaces in a position in which the workpieces will be disposed in predetermined positions. The body member is readily clamped in this position on the support unit, released and removed from the support unit and re-assembled in a turned-over position in which the workpieces are in predetermined angularly rotated positions relative to their original positions.

8 Claims, 8 Drawing Figures

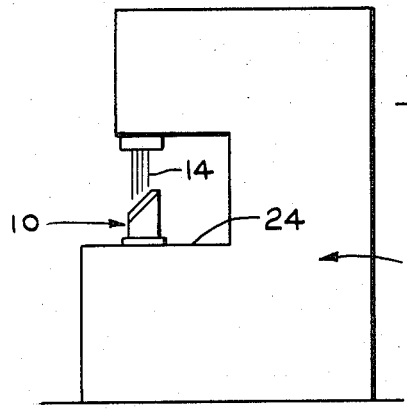
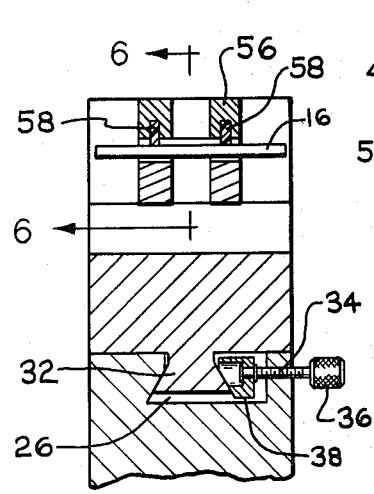
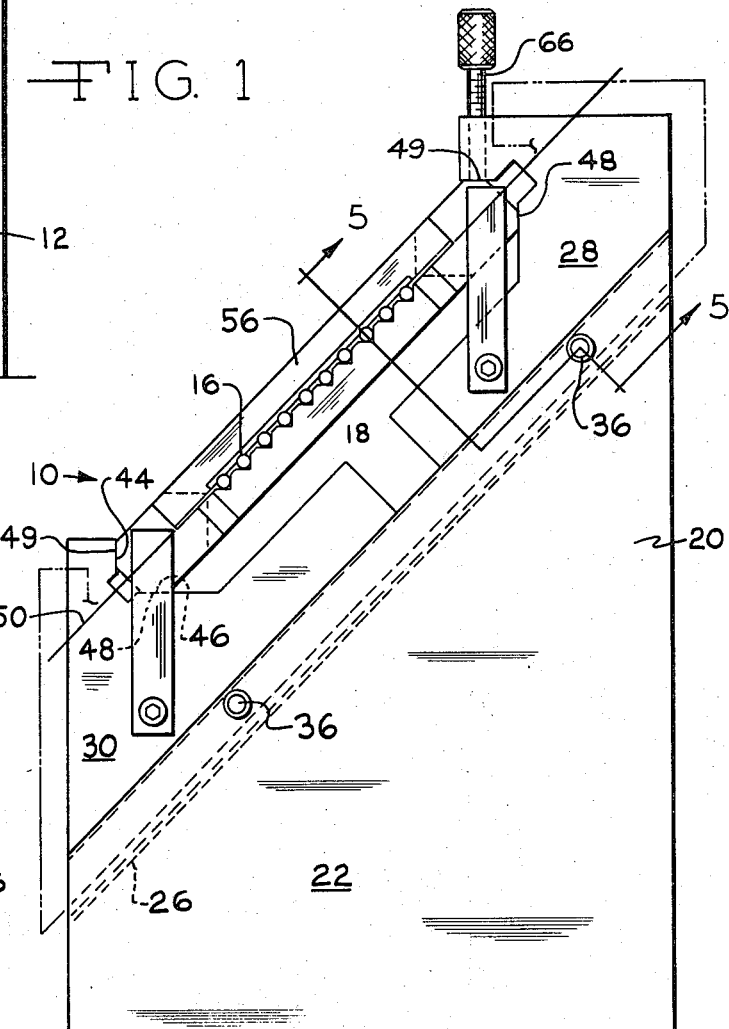
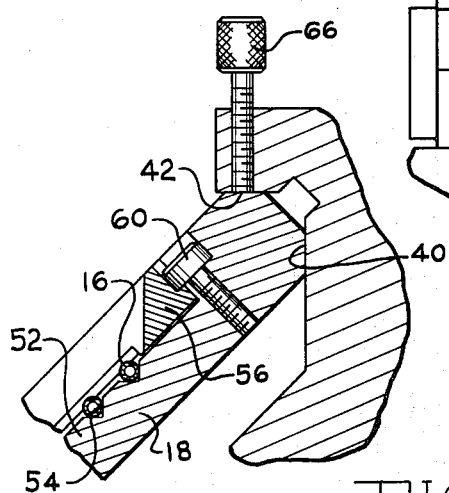

WORKPIECE POSITIONING AND HOLDING APPARATUS

This invention relates generally to the field of locating small workpieces in fixed positions in which work such as drilling, reaming, tapping, etc., can be performed in accurately located predetermined portions of the workpieces. In the past, the available equipment for locating workpieces of this type was expensive and involved prolonged periods of work by skilled machinists in order to accomplish the desired results. The object of the present invention is to provide apparatus that is capable of positioning and holding workpieces in predetermined positions so that repeatable work operations, particularly EDM operations, can be repeatedly performed within very restricted tolerance limits.

The apparatus of this invention consists of a body member which functions like a cassette in that it is readily applied to and removed from a support unit on the work machine, which can be a drilling machine, a reaming machine, an EDM drilling machine or the like. The support unit and the body member are configured so that each time the body member is slipped into a supported position on the support unit, the body member is in exactly the same position.

The body member, in the apparatus of this invention, consists of a generally rectangular metal piece which is provided at its edges with locating surfaces disposed at angles of substantially 45° relative to the transverse or principal axis of the body member. Grooves in the body member are operable to support cylindrical workpieces in positions in which the axes of the workpieces are disposed on the principal axis of the body member. Vertical and horizontal locating surfaces on the support unit engage and support the locating surfaces on the body member so that the principal axis thereof is disposed at 45° with respect to the horizontal. As a result, in one embodiment of the apparatus of this invention where an upright drill or EDM electrode is being used to drill a hole through each workpiece, when the body member is removed, turned upside-down and replaced in the support unit, a second hole can be drilled therein which is at exactly 90° relative to the first hole. This capability of the apparatus of this invention has significant importance from a practical standpoint.

Further objects, features and advantages of this invention will become apparent from a consideration of the following description, the appended claims, and the accompanying drawing in which:

FIG. 1 is a side elevational view of an EDM drilling machine or the like embodying the workpiece positioning and holding apparatus of this invention;

FIG. 2 is a fragmentary enlarged elevational view of a portion of the machine of FIG. 1 showing the apparatus of this invention in greater detail;

FIG. 5 is a fragmentary detailed sectional view of a portion of the apparatus of this invention as seen from substantially the line 5—5 in FIG. 2;

FIG. 7 is an enlarged fragmentary sectional view of a portion of the apparatus of this invention.

Figure 4:
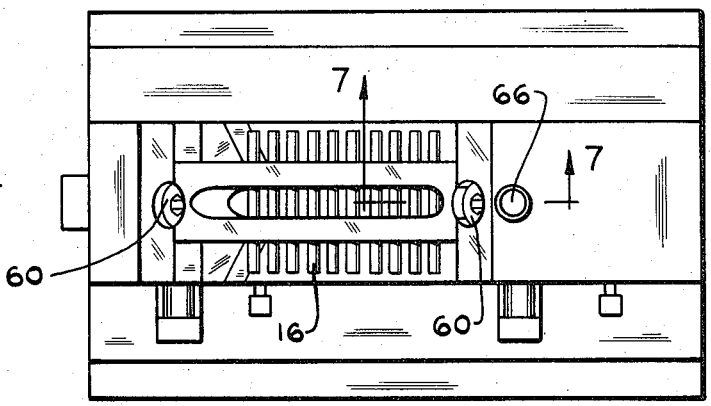
FIG. 4 is a top view of the apparatus of this invention.
Figure 6:
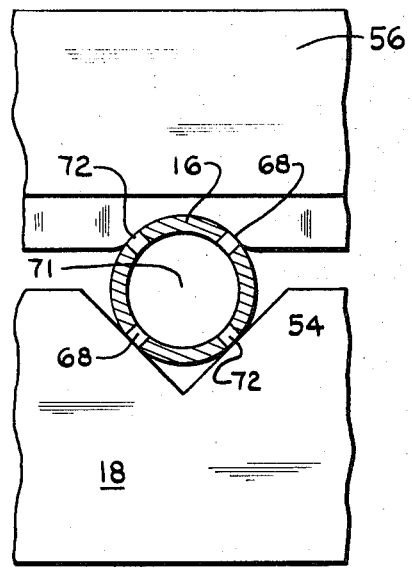
FIG. 6 is an enlarged detail sectional view of a portion of the apparatus of this invention as seen from the line 6—6 in FIG. 5.

With reference to the drawing, the workpiece positioning and holding apparatus of this invention, indicated generally at 10, is illustrated in FIG. 1 mounted on electrical discharge machining apparatus 12 having multiple electrodes 14. The number of electrodes 14 corresponds to the maximum number of workpieces that can be mounted in the apparatus 10. In the illustrated embodiment of the invention, the workpieces are in the form of tubular parts 16 (FIG. 6), but other shape parts can be used. It is to be understood that the apparatus 10 is usable with a variety of machines and is shown in association with the EDM machine 12 only for purposes of illustration.

The apparatus 10 consists of a generally rectangular cassettetype body member 18 (FIG. 2) which is configured so that it can be assembled with, removed from and replaced on a support unit 20 with repeatable accuracy in locating the workpieces 16 thereon in the same positions. The support unit 20 consists of a base 22 supported on the bed 24 of the machine 12. The base 22 is provided on its upper side with an inclined groove 26. The groove 26 is disposed on an incline of substantially 45° with respect to the horizontal in the illustrated embodiment of the invention in which the electrodes 14 are vertical. A pair of support members 28 and 30 are provided with downwardly extending tongues 32 (FIG. 5) which are slidably supported in the groove 26. Set screws 34 having knurled handles 36 and inclined heads 38 (FIG. 5) are mounted on the base 22 for advancement into engagement with the tongues 32 to lock the support members 28 and 30 in fixed spaced relation on the base 22. By releasing the screws 34 and adjusting the positions of the members 28 and 30, the size body member 18 that can be accommodated is adjusted. This is illustrated in broken lines in FIG. 2.

The member 28 has a vertical locating surface 40 and a horizontal locating surface 42 (FIG. 7). The support member 30 has a similar vertical locating surface 44 and a horizontal locating surface 46. The surfaces 40, 42, 44 and 46 coact with locating edge surfaces 48 and 49 on the body member 18 to enable repeatable location of the body member 18 in a precise position on the support unit 22. All the surfaces 48 and 49 are arranged at a 45° angle with respect to a plane 50 which is hereinafter referred to as the transverse or principal axis of the body member 18. The axis 50 is located midway between the bottom pair of locating surfaces 48 and the top pair of surfaces 49. As a result, the body member 18 can be turned upside-down relative to the position shown in FIG. 2 and re-supported on the members 28 and 30 so as to return the axis 50 to the exact position shown. As a result of this manipulation, the workpieces 16 will be located in the exact positions shown in FIG. 2 but rotated 90° relative to those positions.

The body member 18 has a recessed top surface 52 in which a series of V-shaped grooves 54 are formed, each groove 54 being of a size to accommodate a workpiece 16. A cover 56, having downwardly extending resilient inserts 58 (FIG. 5), is mounted on the body member 18 at a location in which the inserts 58 will engage the top sides of the workpieces 16 and retain them in the body member grooves 54. The body member 18 is provided with retaining screws 60 which engage the cover 56 and hold it in a workpiece retaining position on the body member 18.

Figure 3:
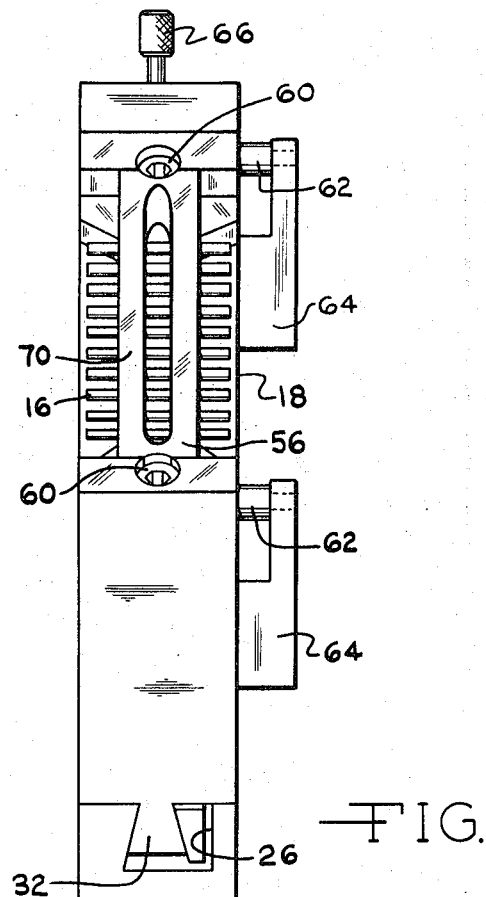
FIG. 3 is a front elevational view of the apparatus of this invention.

In the use of the apparatus 10 of this invention, the rectangular body member 18 is initially moved from a position to one side of the support members 28 and 30 into a position in which the body member locating surfaces 48 slide on the locating surfaces 40 and 46 and the surfaces 49 slide on the surfaces 42 and 44. This horizontal movement of the body member 18, with the workpieces 16 held in fixed positions thereon by the cover 56, is continued until the body member hits end stops 62 mounted on brackets 64 carried by the support members 28 and 30. A knurled set screw assembly 66, associated with the locating surface 42, is then advanced into engagement with the body member 18, as shown in FIG. 7, to retain the body member 18 in this position on the members 28 and 30. The EDM machine 12 is then operated to advance the electrodes 14 through the workpieces 16 to form, for example, the through hole 68. As shown in FIG. 3, the cover 56 has a central portion 70 that overlies the workpieces 16 that is both slotted and narrower than the body member 18 to enable easy access of the electrodes 14 to various portions of the workpieces 16. It is to be understood, also, that the electrodes 14 could be drills, reamers, taps, or similar well known machine tool elements.

After the through hole 68 has been completed and the electrodes 14 have been withdrawn from the workpieces 16, the set screw 66 is released, and the cassette-type body member 18 is moved horizontally to the left, as viewed in FIG. 3, to a position removed from the support members 28 and 30. The body member 18 is then turned end for end relative to the position shown in FIG. 2 which acts to rotate each of the workpieces 16 through an angle of 90°. In other words, the body 18 is rotated 180° about a vertical axis to move the upper end of the body to a position in which it is now the lower end. The body member 18 is then re-assembled with the support members 28 and 30 by sliding the body member surfaces 49 horizontally on surfaces 40 and 46 and sliding surfaces 48 on surfaces 42 and 44 to a position in which body member 18 is against the stop 62. The set screw 66 is then retightened.

The manipulation just described provided for a repositioning of the workpieces 16 so that the axis 71 of each workpiece is repositioned perpendicular to and lying on the axis 50. This enables reoperation of the machine 12 to form a second through hole 72 in the workpiece 16 which is exactly perpendicular to the hole 68 previously formed. Thus, the apparatus 10 of this invention is operable to efficiently position and reposition workpieces 16 in predetermined locations on the machine 12. The workpieces 16 can be bench assembled with the body member 18, by virtue of the cassette-type construction of the body member 18 so that the machine 12 does not have to be inoperative during assembly of the workpieces 16 with the body member 18. If desired for a particular machining operation, the parts 16 can be rotated 180° by rotating the body member 18 about the axis 50 so as to turn the body member 18 upside down and locate the cover 56 below the body member 18 which is slotted similarly to the cover 56 to enable access to the parts 16 by the electrodes 14. It is to be understood that the apparatus of this invention is also readily adaptable to machining situations in which the electrodes 14 are not disposed vertically. In such case, the body member 18 is supported so that the axis 50 is maintained at a 45° angle with respect to the electrodes 14. Also, it should be understood that the 45° relationship can be varied in the event an angular relationship of the holes 68 and 72 different than 90° is desired.

Figure 8:
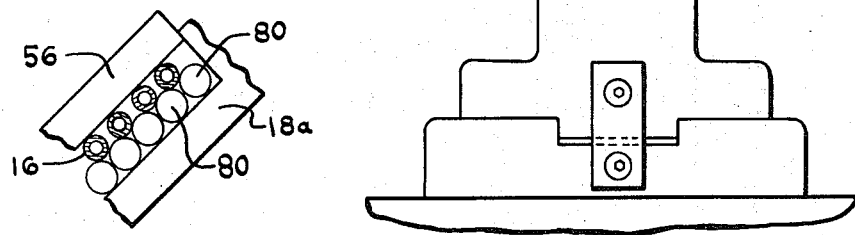
FIG. 8 is a view similar to FIG. 7 of a modified form of the apparatus of this invention.

In FIG. 8, a modified form of body member is illustrated and indicated generally by the numeral 18a. The body member 18a has a plurality of rods 80 mounted therein so as to form generallly V-shape grooves between the rods 80 in which the workpieces 16 can be nested. The grooves formed by the rods 80 have arcuate side surfaces rather than straight side surfaces as is the case with the grooves 54 shown in FIG. 7. The principal advantage of the modified body member 18a is that the rods 80 can be formed of electrically nonconducting material, such as ceramic, when desired, in order to avoid electrical shorting problems which characteristically occur in EDM machines. In all other respects, the body member 18a is identical to the body member 18.

What is claimed is:

1. Workpiece positioning and holding apparatus comprising a support unit having spaced supporting surfaces disposed at predetermined locations thereon and movable toward and away from each other, a body member having locating surfaces removably engaged with and supported on said supporting surfaces so as to locate said body member in a predetermined position on said support unit, said body member including means forming retaining surfaces on which workpieces can be supported, and a top assembly removably mounted on said body member in a position clampingly retaining workpieces supported on said retaining surfaces, said body member having a principal axis and said locating surfaces being symmetrical with respect to said axis thereby enabling support of said body member in a plurality of different positions on said supporting surfaces without changing the position of said principal axis relative to said supporting surfaces.

2. Apparatus for positioning and holding workpieces according to claim 1 wherein said support unit includes a pair of members movable toward and away from each other to various fixed positions to adjust the spacing between some of said supporting surfaces to thereby adapt said support unit to different size body members.

3. Apparatus for positioning and holding workpieces according to claim 2 wherein said retaining surfaces are grooves.

4. Apparatus for positioning and holding workpieces according to claim 3 wherein said grooves are generally V-shaped surfaces formed in said body member.

5. Apparatus for positioning and holding workpieces according to claim 3 wherein said grooves are formed by substantially cylindrical members arranged in edge-to-edge contact so as to form said grooves therebetween.

6. Apparatus for positioning and holding workpieces according to claim 5 wherein said cylindrical members are formed of a non-electrical current conducting material.

7. The combination according to claim 1 wherein said principal axis is located to pass through the axes of cylindrical workpieces supported on said retaining surfaces, said support unit and body member surfaces being located to position said axis at an angle of substantially 45° relative to horizontal in the supported position of said body member on said support unit.

8. Apparatus for positioning and holding workpieces according to claim 6 wherein said body member has top and bottom locating surfaces disposed at substantially 45° angles relative to said plane to thereby enable disposition of said body member in a plurality of different positions on said support unit.

* * * * *